E. C. HOLMES.
SCREW.
APPLICATION FILED JUNE 20, 1914.
1,288,893.
Patented Dec. 24, 1918.
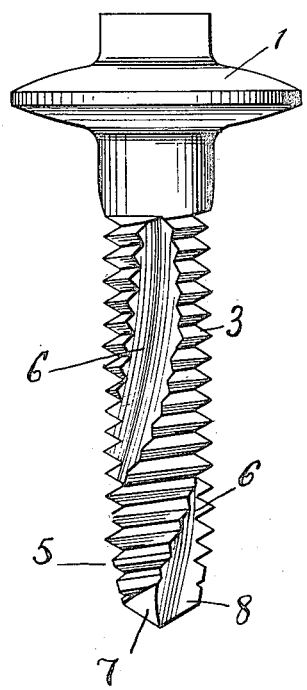
Witnesses
Oliver Farman
Katherine Smith
Inventor
Edward C Holmes
by Allen & Allen
Attorneys

UNITED STATES PATENT OFFICE.

EDWARD C. HOLMES, OF NORWOOD, OHIO.

SCREW.

1,288,893.  Specification of Letters Patent.  Patented Dec. 24, 1918.

Application filed June 20, 1914. Serial No. 846,231.

*To all whom it may concern:*

Be it known that I, EDWARD C. HOLMES, a citizen of the United States, and a resident of the city of Norwood, Hamilton county, Ohio, have invented certain new and useful Improvements in Screws, of which the following is a full, clear, and exact description, reference being had to the accompanying drawings, forming a part of this specification.

It is now a conceded fact, based upon long usage, that the common or ordinary railway spike is inadequate and not in harmony with the factor of safety that is and should be demanded in laying and keeping in place the rails of modern times. It is also well known that a screw forced into timber has many times the holding power over any form of like nature that could be driven into wood, even if the latter form were designed with barbs and depressions. The purpose of the screw which forms the subject of this invention is to provide a screw spike which will force itself into all kinds of hard wood easily and quickly, with the least amount of labor. In order to accomplish this purpose I combine in my screw the functions of the drill, tap and screw, and that it may be more efficient it is provided with two flutes one on either side, so as to facilitate cutting power and prevent as much as possible the rising to the surface of chips and sawdust. Instead of the fiber being broken as is the case with the spike driven into the wood, the fiber of the wood is cut and threaded, each thread forming a strong factor of resistance. The head of the spike is formed so that a socket piece will fit over it, and this socket is preferably for use as a special brace, said brace being used exclusively for screwing the spike in and out of the railway tie. All of which will appear more clearly in the following specification, and the novelty of which will be duly claimed.

In the drawing,

The figure is a side elevation of the screw.

The head 1 of the screw spike is of the special shape shown in the drawing, so as to accommodate a special shaped chuck, and has a beveled under surface so as to engage the flange of a rail when used in railroad construction work.

The shank 3 of the screw is cylindrical in shape, and of considerable length. This shank is of one diameter only, because if the shank tapered at all, the task of turning so heavy a spike into a thick, hard timber such as a railroad tie, would be impracticable altogether. It is on this shank that the screw-threads are formed, preferably six standard threads to the inch, and running clear to the head, or not, as desired.

At the end of the shank is the taper 5. This taper is preferably made by flattening the edges of the screwthreads so as to cause the shank to slope off at a taper to a blunt point.

The screw end is to all intents and purposes that of a standard drill of the gage of the screw, the taper being cut to form the cutting edges 7, 7, and the clearance spaces 8, 8, of such a drill.

Running up from the clearance spaces 8, 8, which are spiral as in all drills, are the flutes 6, 6, one for each side, being directioned as continuations of the spaces 8, 8. I make these flutes preferably in a spiral. The flutes 6, 6, may be made straight, but for the reasons to be developed the spiral is preferred. In the first place, the providing of a screw with a head, a straight, that is, cylindrical shank, a taper, a drill, and clearance spaces of any kind provides a screw spike which will go into the wood and stay there. Other spikes will go in, but will not stay, being in the form of a gimlet. Others have no clearance spaces, or else have a tapered shank, and will not go into the hard woods under practical conditions without first having a hole bored for them.

While either straight or spiral flutes can be employed, I have found that for hard woods such as oak or hickory, the spiral flutes are preferable over the straight.

When the spike is inserted in, say a railroad tie, it is set in place with no hammering, and simply screwed in. The taper passes in easily being part of a drill, and the shank of the screw being cylindrical and of uniform diameter, there is no wedging apart, the planes of the threads carrying the screw in easily. The presence of the flute is necessary to take care of the wood displaced by the screw in going in. If this removed wood or chip becomes wedged in the flutes, then only great pressure would suffice to send in the screw. The drill portion continually cuts out a way for itself and sends upwardly the chips. The spiral flute seems to cause these chips to continually mount upwardly as the screw sinks in, and therefore I prefer this spiral form to effectually prevent jamming of the drill chips.

The advantage of a screw over a straight spike, is clear without any remark. The necessity of boring a hole is done away with by my spike, by having a drill end, and the final difficulty of clogging and undue friction is overcome by so providing for the chips drilled out as the screw sinks that they do not jam and prevent the sinking.

Having thus described my invention, what I claim as new and desire to secure by Letters Patent, is:—

A screw spike adapted to be inserted into wood without a preliminary boring thereof, comprising a drill portion at the one end thereof, comprising a plurality of cutting edges, a head portion, a cylindrical shank portion having contiguous screw threads cut thereon, a taper portion between the shank and the drill, and a plurality of spiral flutes one for each cutting edge, extending up the shank and terminating below the head, substantially as described.

EDWARD C. HOLMES.

Witnesses:
 HELEN L. AICHHOLZ,
 ANNA F. DIENST.